INVENTOR.
Vincent G. Krenke
BY
Johnson and Kline
ATTORNEYS

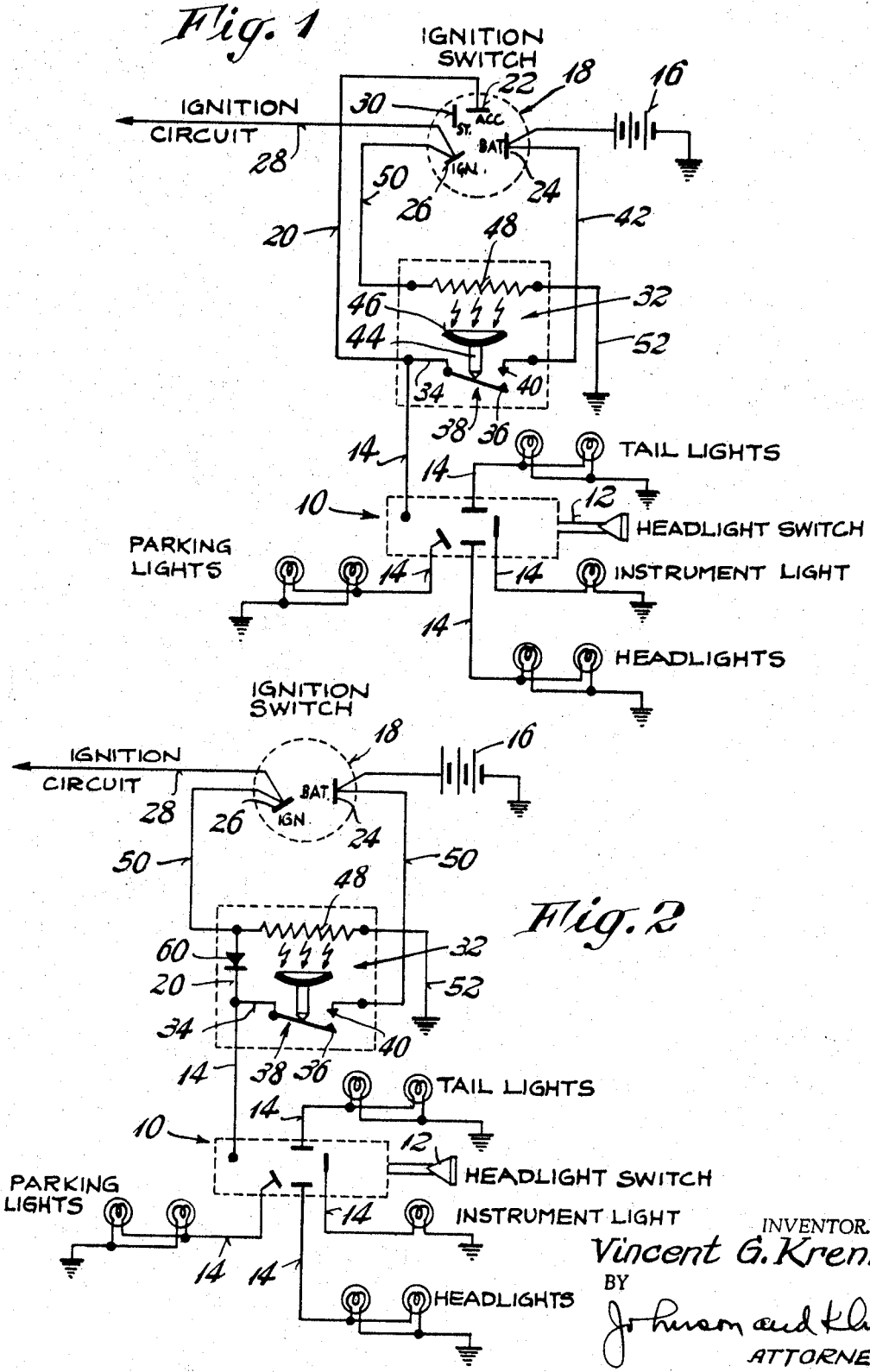

United States Patent Office 3,433,969
Patented Mar. 18, 1969

3,433,969
DELAYED ACTION CIRCUIT CONTROLLER
Vincent G. Krenke, Fairfield, Conn., assignor to Casco Products Corporation, Bridgeport, Conn., a corporation of Connecticut
Filed Sept. 13, 1965, Ser. No. 486,883
U.S. Cl. 307—10                                          12 Claims
Int. Cl. H02b *1/00, 3/00*

ABSTRACT OF THE DISCLOSURE

A control device for a main load circuit including a main switch and/or an auxiliary load circuit having an auxiliary switch, the control device having a shunt circuit for temporarily energizing the auxiliary circuit when the main circuit switch is opened, the shunt circuit including a switch and means for actuating the switch to close the shunt circuit when the main switch is closed and to open the shunt circuit after the lapse of a predetermined time after the main switch is opened.

---

This invention relates generally to improvements in delayed action circuit controllers and more particularly to a control device for automatically disconnecting a load circuit from a source of electrical energy to prevent exhaustion of the latter if the load circuit is inadvertently left completed by manual control means.

The invention has general utility, but it is particularly directed to the problem of automobile head lights being inadvertently left on after the operator parks and leaves his automobile at night, with the result that if this condition is too prolonged the car battery's charge will become useless to start the car. This is a frequent occurrence, particularly in those situations where a car is parked in a reasonably well lighted area, such as lighted private or public parking garages or downtown streets, and where consequently it is not readily apparent to the operator that the head lights are on.

Prior art attempts to solve this problem have not been completely successful and have not met with general public acceptance. In many instances these solutions have involved relatively complicated and expensive electrical components, or they have failed to provide the desired head light shut-off within a short enough time to prevent the battery from becoming incapable of starting the engine.

Still further, some prior solutions rely upon continuously maintaining an actuating element energized all the time that the car is parked without the engine running in order to maintain the light circuit open, thereby imposing a continuous drain on the battery. This eventually causes a malfunction of the circuit controller due to loss of battery power, after which the head lights come on and completely exhaust the battery.

It is accordingly a principal general object of this invention to provide an improved delayed action circuit controller for automatically disconnecting a load circuit from a source of electrical energy a predetermined time after a primary control means for the load circuit is de-energized even though a secondary control means in the load circuit remains energized.

A more specific object is to provide a delayed action circuit controller for automatically disconnecting any desired load circuit of an automobile, such as the lighting system, from the battery thereof a predetermined time after the ignition switch is turned off, and yet which avoids or eliminates the disadvantages of prior art constructions.

Another object is to provide a control device which is activated and deactivated upon closing and opening respectively of the ignition switch, and which is operable upon being deactivated to interrupt the light circuit a predetermined time after such deactivation so that no current is drawn from the battery once the load circuit is interrupted.

Still another object is to provide an improved control device which delays only the time of interruption of the light circuit but permits instantaneous energization of the light circuit when the ignition switch is turned on.

A feature of the present invention is the provision of means for connecting the light circuit directly to the battery coupled with an ignition switch controlled relay in the light circuit so that the normally heavy load from the automobile lights is not drawn through an otherwise heavily loaded ignition switch.

Another feature is the provision of means controlling the light circuit alternatively through the normal operating circuits of the ignition switch or through a starter solenoid circuit so that the automobile can be started without deenergization of the light circuit.

A still further object of the present invention is to provide a delayed action circuit controller which is extremely simple in construction, economical to manufacture and relatively easy to install in existing automobile electrical systems as well as to incorporate during the manufacture of new automobiles.

The principles of the present invention are embodied in a control device for use in combination with a load circuit having a manual off-on switch in the load circuit for secondary control thereof, a source of current, and a second switch connected to the source of current for normal control of auxiliary circuits. Means are provided for connecting the load circuit to the current source so that the latter is under primary control of the second switch. Thus both switches are operable in series on the load circuit. The second switch completes and interrupts another circuit which is connected to a normally open time delay switch means, the latter having switch elements in a shunt circuit which connects the load circuit to the current source independently of the second switch. The switch means is responsive to the closing and the opening of the second switch to respectively complete and interrupt the shunt circuit, and has time delay means for delaying the interruption of the shunt circuit a predetermined time after the second switch is opened. Thus the load circuit remains connected to the current source for the predetermined time after the second switch is opened and the switch means is deenergized, after which the load circuit is disconnected from the current source even though the manual switch remains closed.

The foregoing and other objects and advantages of the present invention will become more apparent from a consideration of the following detailed description thereof when considered in conjunction with the accompanying drawings wherein like reference numerals are used throughout the several views to indicate similar parts, in which:

FIGURE 1 is a wiring diagram of a portion of an automobile electrical system illustrating only so much thereof as is essential for an understanding of the present invention;

FIG. 2 is a diagram similar to FIG. 1 illustrating a modified ignition switch and load circuit connection;

Figure 3:
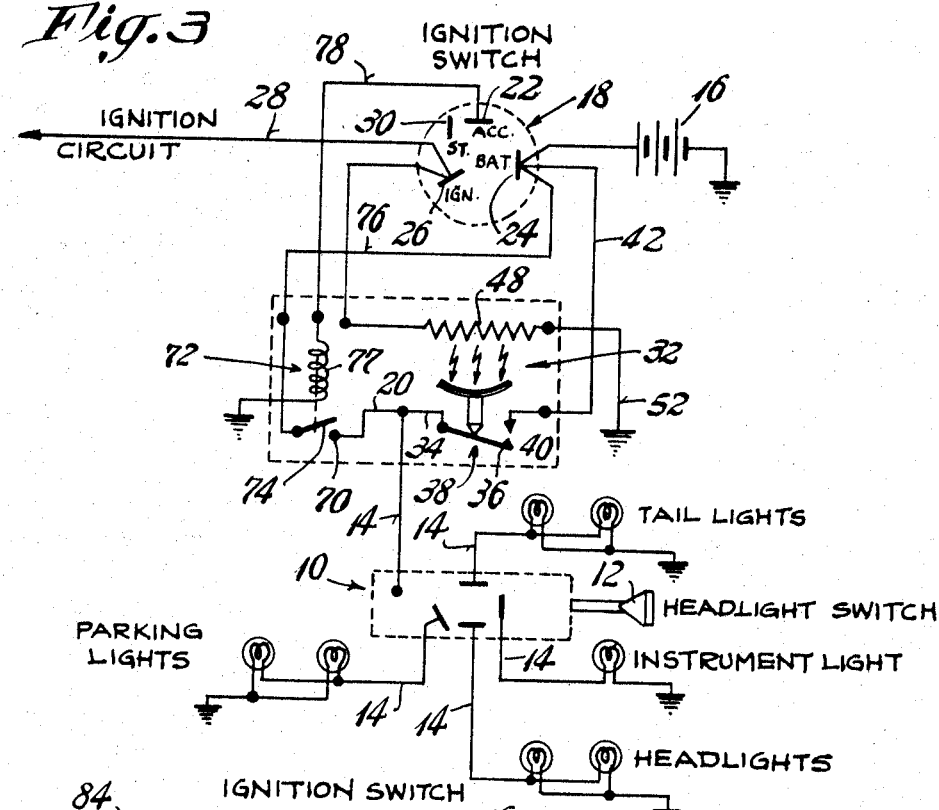
FIG. 3 is a diagram similar to FIG. 1 illustrating a load transfer connection of the load circuit directly to the battery but still under the control of the ignition switch.

Referring to FIG. 1, a portion of the customary lighting system of an automobile is seen to comprise a manually operated off-on light switch 10 having at least a dual position handling knob 12 for selective control of the parking lights, tail lights and instrument lights in one position, and all of the above plus the head lights in another position. All of these lights are in individual circuits from the switch 10, these circuits being grounded to the automobile frame after connecting through the various lights and constitute integral parts of what is hereinafter called the load circuit, the latter generally indicated by the reference numeral 14. It will be understood that circuits other than those containing lights, or load devices in other environments, may be controlled by the present invention, but for the purpose of illustration and description the load circuit will be confined to the standard lighting system of an automobile operated by the switch 10.

The automobile is also conventionally provided with a battery 16 grounded to the frame to complete the negative connection to the light circuit 14. The positive terminal of the battery 16 is connected to the customary key operated ignition switch 18 through which current is supplied to the electrical components of the engine and other automobile accessories.

In normal practice, the load circuit 14 is connected directly to the battery so that operation of switch 10 turns the lights on or off independently of the ignition switch 18, thereby permitting the operator to turn off the ignition switch while inadvertently leaving the lights on. In the present invention, however, means are provided for connecting the load circuit to the battery either through the ignition switch 18 so that the latter and the manual switch 10 are in series in the load circuit, or directly to the positive connection of the battery but through a circuit and switch means which is under the control of the ignition switch 18. This means is intended herein to include merely the binding post on the control device to which the normal load circuit and a connecting circuit to the ignition are connected, or additionally other leads and control elements which may be utilized to connect the load circuit to the battery but under the control of the ignition switch. By either of these constructions, the ignition switch 18 becomes a primary control means on the load circuit since it and the manual switch 10 become functionally operable in series on the load circuit, and the ignition switch must be in closed position in order to normally operate the lights by means of the secondary control afforded by the manual switch 10.

In the form illustrated in FIG. 1, the former series connection construction is utilized wherein the load circircuit 14 is connected by a lead 20 to an accessory terminal 22 of the ignition switch 18, the accessory terminal 22 being connected to a battery terminal 24 when the ignition switch is set either in the accessory or ignition positions as is well known by those skilled in the art.

The ignition switch 18 is further provided with an ignition terminal 26 which connects an ignition circuit 28 to the battery, and a starter terminal 30 which connects a starter circuit (not shown) to the battery.

The control device comprises a normally open time delay switch means generally designated by the numeral 32 which is connected to the battery through the ignition switch 18 for control thereby, and which is operable upon actuation to control the energization of a shunt circuit which connects the load circuit 14 to the battery independently of the ignition switch. More specifically, a lead 34 is connected to the movable contact 36 of a control switch 38, the fixed contact 40 of which is connected to a lead 42 which in turn is connected to the battery terminal 24 of the ignition switch 18. This defines a shunt circuit which by-passes the ignition switch 18 from the load circuit 14 to the battery when the contacts 36-40 of switch 38 are closed.

The movable contact 36 of control switch 38 is connected to or carried by a movable connecting element 44 of an electromechanical actuating means which preferably comprises a suitable thermostatic element such as the snap-acting concave-convex bi-metallic disk 46. The disk is suitably fixedly mounted so that actuation thereof causes movement of the connecting part 44 to open and close the contacts 36 and 40. The disk 44 is biased to normally keep the contacts 36 and 40 open and to close them upon the disk 44 reaching a predetermined elevated temperature.

The thermostat disk 46 is acted upon by a heating element 48, preferably of the resistance type, which is inserted a third circuit comprising a lead 50 connected to the ignition terminal 26 of the ignition switch 18, and a lead 52 connecting the heater 48 to ground. The heater may either be mechanically attached to the same support as the disk thermostat 46 or it may be bonded to the surface thereof.

In operation, when the ignition switch turned to the normal "on" position, i.e., the ignition terminal 26 is connected to the battery terminal 24, the accessory terminal 22 is also connected to the battery terminal 24 by the conventional switching construction of the ignition switch 18. At this time the load circuit may be energized by moving the control knob 12 of manual switch 10 to an "on" position, current being drawn to the load circuit 14 through lead 20 to provide instantaneous light.

Simultaneously with turning on the ignition switch, the heater 48 is energized so that heat is conducted to the disk thermostat 46. After a period of time, the disk will snap over center at a particular elevated snap temperature and close the normally open contacts 36 and 40. While the invention is not limited to the use of a disk thermostat, this is preferred since it snaps in one direction at a predetermined elevated temperature and snaps back in the opposite direction at a predetermined lower temperature.

When the control switch 38 closes, the load current then flows through the shunt circuit (lead 42, switch 38 and lead 34) to the load circuit 14. After the control switch 38 has closed and the ignition switch 18 is turned off, and assuming the manual switch 10 remains on, the load current is still flowing through the shunt circuit to the load circuit and the lights remain on. However, the power to the heater 48 has been removed by turning off the ignition switch and the thermostat disk begins cooling to a point where the disk snaps over center again to open the control switch 38, which in turn interrupts the shunt circuit and thereby automatically extinguishes the lights.

The delayed turn-off period is that time from when the ignition switch is turned off to when the disk thermostat cools to the predetermined lower temperature, during which time the shunt circuit is completed to maintain the load circuit energized and after which the load circuit is deenergized. This time period is predetermined by selecting a disk thermostat having predetermined operating temperatures and a predetermined rate of heat loss.

By this construction the lights of the automobile are automatically turned off even though the manual control switch 10 is inadvertently left on, and no further drain on the battery takes place thereafter. The principal function of the time delay is to afford the operator an opportunity to observe that he has left the manual switch 10 on after getting out of the automobile so that he will turn off the lights in the usual manner.

The invention is not limited to the heat responsive switch means 32 described above. For example, a time delay relay could be utilized in which the switch contacts of the relay are inserted in the shunt circuit as the contacts 36 and 40, the coil of the relay being connected in the third circuit (leads 50 and 52). The relay is provided with a dashpot or other suitable time delay means for delaying operation of the relay at least in the direction of movement for interrupting the shunt circuit. Thus the invention is intended to encompass any normally open time delay electro-mechanical switch means which is connected to the battery through the ignition switch and which is responsive to closing and opening thereof for respectively completing and interrupting the shunt circuit, with means for delaying the operation of the switch means to interrupt the shunt circuit for a predetermined time after the switch means is deenergized by opening the ignition switch.

In this situation it may be possible to eliminate the lead 20 and utilize only the shunt circuit if the selected time delay relay is instantaneously operable to close the contacts 36 and 40 when the coil is energized upon turning on the ignition switch. However, if the relay is slow moving in both directions, the lead 20 is still necessary to provide instantaneous illumination.

FIG. 2 illustrates a form of the invention for use with an ignition switch 18 which is of the relatively uncommon type having only a battery terminal 24 and an ignition terminal 26, the starter solenoid and all other accessories being directly connected to the battery 16 through their individual manual control switches. In this embodiment, the lead 20 is connected to the ignition terminal 26, either directly or at some suitable intermediate point along the lead 50 which connects the heater 48 to the ignition terminal 26. A suitable one-way valve such as the diode 60 is inserted in the lead 20 to block any current from flowing back to the heater 48 and the ignition circuit 28 when the ignition switch 18 is turned off but while the contacts 36 and 40 in the shunt circuit are still closed.

The remainder of the construction of this form and the mode of operation thereof is identical to that described above in regard to FIG. 1, except that instantaneous energization of the load circuit 14 is obtained through the ignition terminal 26 rather than an accessory terminal.

FIG. 3 illustrates still another form of the invention again with the more conventional ignition switch illustrated in FIG. 1, but with the provision of means for energizing the load circuit directly from the battery terminal 24 of the ignition switch 18 coupled with an ignition switch controlled relay in the load circuit so that the ignition switch 18 and the manually operable switch 10 are still operable in series on the load circuit 14. This is advantageous where the accessory terminal 22 is already heavily loaded with accessory electrical equipment and it is undesirable to further impose the high current draw of head lights on this terminal.

Accordingly, the lead 20 connected to the load circuit 14 is also connected to one of the contacts 70 of a relay switch 72, the other contact 74 of which is connected by a lead 76 to the battery terminal 24 of the ignition switch 18. The contact 74 is carried by or connected to the armature of the relay 72, the coil 77 of which is connected by a lead 78 to the accessory terminal 22 of the ignition switch 18, the other side of the coil being grounded. The remainder of the construction of this embodiment is identical with that described in FIG. 1.

When the ignition switch is turned on, the relatively low current capacity relay coil 77 is energized to close the contacts 70 and 74, thereby completing a circuit from the battery terminal 24 to the load circuit 14. When the ignition switch is turned off, this circuit is immediately interrupted, but the load circuit 14 remains energized through the shunt circuit for the predetermined time delay of the switch means 32.

Figure 4:
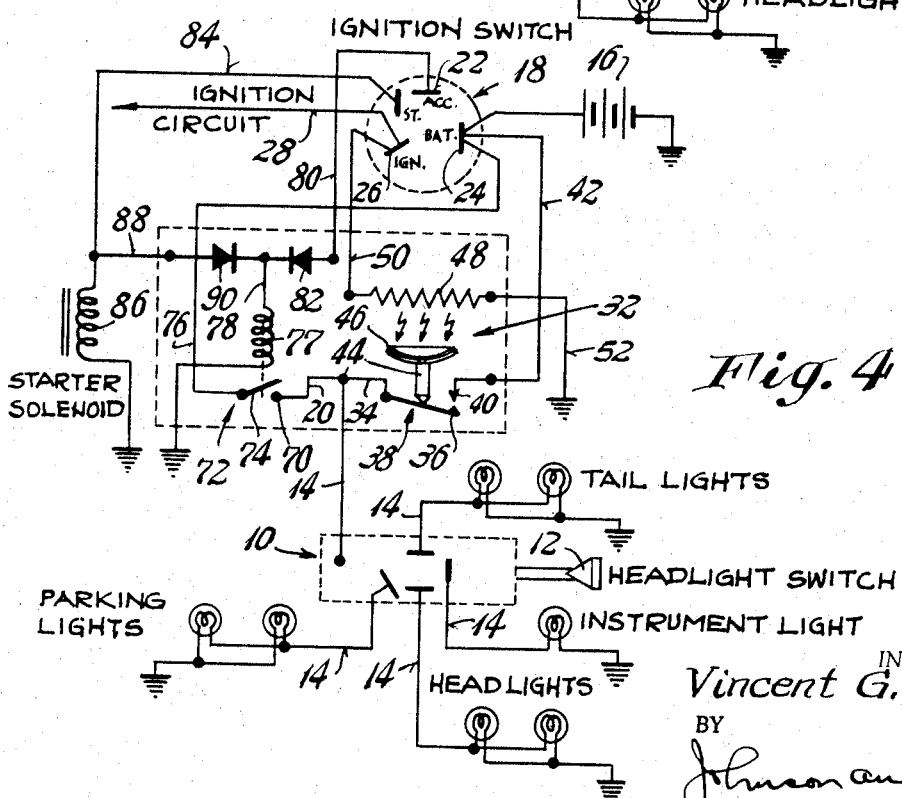
FIG. 4 is a diagram similar to FIG. 1 illustrating a load circuit connection for control through the ignition switch which is maintained energized during operation of the starter solenoid.

FIG. 4 illustrates yet another form of the invention in which provision is made for keeping the load circuit energized when the automobile engine is being started. This is advantageous in those situations where the engine stalls while the car is moving and it is the practice of the operator to merely shift the transmission into neutral, restart the engine, and then shift back into driving gear, all while the automobile continues to move. The hazards of this practice on a dark or dimly lighted street without head lights are readily apparent, and in the forms illustrated in FIG. 1 and FIG. 3, the head lights are extinguished during starting because in conventional ignition switches the accessory terminal is disconnected from the battery terminal when the latter is connected to the starter terminal.

To overcome this difficulty, a construction very similar to that illustrated in FIG. 3 is utilized in which the relay switch 72 controls that part of the load circuit 14 which connects through leads 20 and 76 to the battery terminal 24. However, the relay coil 77 is energizable from two sources, either directly from the accessory terminal 22 through a lead 80, a one-way valve means such as the diode 82, and lead 78, or from the starter terminal 30 through the normal starter circuit comprising a lead 84 connected to the starter solenoid 86, and a shunt lead 88 connected back to the lead 78, the lead 88 also having a one-way valve means such as the diode 90 inserted therein.

With the ignition switch in the normal "on" position, the load circuit is energized, and the control device 32 functions in the same manner as that described above in connection with the form illustrated in FIG. 3, relay coil 77 being energized through the accessory terminal 22, lead 80, diode 82 and lead 78. However, if the engine stalls and the ignition switch is turned to the "start" position to restart the engine, energizing current for relay 77 is drawn from the start terminal 30, lead 84 to the starter solenoid 86 and the shunt lead 88 and diode 90 to lead 78. Thus the contacts 70 and 74 are maintained closed and the load circuit 14 remains energized while the engine is being restarted.

It should be noted that normal head light operation through the secondary control of manual switch 10, with both instantaneous "on" and "off," may be obtained in the forms of FIGS. 1, 3 and 4 merely by turning the ignition switch to the "accessory" position wherein the load circuit 14 becomes energized but the heater 48 is not energized, thereby keeping the shunt circuit out of operation.

The invention disclosed herein is not to be considered as limited to the specific forms described and shown in the accompanying drawings, these being merely illustrative of the principles of the invention which is intended to cover all such variations and modifications thereof as may be deemed to be within the scope of the appended claims.

I claim:

1. In combination with a battery, a main load circuit, a main switch for the main load circuit having a battery terminal and a main load terminal, an auxiliary load circuit and an auxiliary switch for the auxiliary load circuit, a control circuit including a time delay switch means between said main switch and said auxiliary switch, said time delay switch means including a shunt circuit connected to the battery terminal of the main switch and to the auxiliary switch, a normally open shunt circuit switch in the shunt circuit, and actuating means for said shunt circuit switch comprising a resistance heater connected to the load terminal of the main switch and energized while the main switch is closed and denergized when the main switch is open, and heat-responsive means for maintaining said normally open shunt circuit switch closed while the heater maintains a predetermined temperature and for causing the shunt circuit switch to return to normally open position after a predetermined time after said heater is deenergized by the opening of the main switch, said predetermined time being the time required for said heat-responsive means to cool to a determinate temperature.

2. The invention as set forth in claim 1 wherein said main switch further includes a third terminal independently connectible to said battery terminal and connectible thereto with said load terminal, and wherein there are means for connecting said auxiliary load circuit to said battery comprising a lead connected to said third terminal whereby said auxiliary load circuit is energizable instantaneously independently of said shunt circuit.

3. The invention as set forth in claim 1 wherein there are means for connecting said auxiliary load circuit to said battery comprising a lead connected to said main load terminal, and a one-way valve means in said auxiliary load circuit intermediate the connection of said shunt circuit to said auxiliary load circuit and said main load terminal to permit current to flow directly from said main load terminal to the auxiliary circuit when said main switch is closed, whereby said auxiliary circuit is energized instantaneously independently of the closing of said shunt circuit switch, and to prevent current from flowing from the shunt circuit to said switch means when the shunt circuit switch is closed and the main switch is open.

4. The invention as set forth in claim 1 wherein said main switch further includes a third terminal independently connectible to said main terminal and connectible thereto through said load terminal, and wherein there are means for connecting said auxiliary load circuit to said battery comprising a lead connected to said main terminal, and a relay having relay contacts interposed in said lead, the coil of said relay being connected to said third terminal whereby said relay coil is energizable from said third terminal and said auxiliary load circuit is energizable instantaneously independently of said shunt circuit and directly from said third terminal.

5. The invention as set forth in claim 1 wherein said heat-responsive means is a snap-acting bi-metallic concavo-convex disk biased to snap over center in one direction in response to reaching a predetermined elevated temperature and to snap back in response to cooling to a predetermined lower temperature, the rate of cooling of said disk from said elevated temperature to said lower temperature determining said predetermined time.

6. In combination with a battery, an ignition circuit, an ignition switch for the ignition circuit having a battery terminal and an ignition terminal, a light circuit energized by said battery and a light switch means for the light circuit, a control circuit for the light circuit including a time delay switch means between said ignition switch and said light switch means, said time delay switch means including a normally open switch, and means for controlling said normally open switch comprising a resistance heater connected to the ignition terminal of the ignition switch and energized while the ignition switch is closed and deenergized when the ignition switch is open, and heat-responsive means for maintaining said normally open switch closed while the heater maintains a predetermined temperature and for causing the normally open switch to return to normally open position after a predetermined time after said heater is deenergized by the opening of the ignition switch, said predetermined time being the time required for said heat-responsive means to cool to a determinate temperature.

7. In combination with a battery, an ignition circuit, an ignition switch for the ignition circuit having a battery terminal and an ignition terminal, a light circuit and a light switch for the light circuit, time delay switch means between said ignition switch and said light switch, said time delay switch means including a shunt circuit connected to the battery terminal of the ignition switch and to the light switch, a normally open shunt circuit switch in the shunt circuit, and actuating means for said shunt circuit switch comprising a resistance heater connected to the ignition terminal of the ignition switch and energized while the ignition switch is closed and deenergized when the ignition switch is open, and heat-responsive means for maintaining said normally open shunt circuit switch closed while the ignition switch is closed and for causing the shunt circuit switch to return to normally open position after a predetermined time after said heater is deenergized by the opening of the ignition switch, said predetermined time being the time required for said heat-responsive means to cool to a determinate temperature.

8. The invention as set forth in claim 7 wherein said heat-responsive means comprises a snap-acting bi-metallic concavo-convex disk connected to said shunt circuit switch and biased to snap over center in one direction upon reaching a predetermined elevated temperature when said resistance heater is energized to cause said shunt circuit switch to complete said shunt circuit, and to snap back in the opposite direction upon cooling off to a predetermined lower temperature after said resistance heater is deenergized to cause said shunt circuit switch to interrupt said shunt circuit, the rate of cooling off of said disk from said elevated to said lower temperatures determining said predetermined time.

9. The invention as set forth in claim 7 wherein said ignition switch further includes an accessory terminal independently connectible to said battery terminal and connectible thereto with said ignition tetrminal, and wherein means for connecting said light circuit to said battery comprises a lead connected to said accessory terminal whereby said light circuit is energizable instantaneously independently of said shunt circuit.

10. The invention as set forth in claim 7 wherein there are means for connecting said light circuit to said battery comprising a lead connected to said ignition terminal, and including a one-way valve means in said light circuit intermediate the connection of said shunt circuit to said light circuit and said ignition terminal to permit current to flow directly from said lead to said light circuit when said ignition switch is closed, whereby said light circuit is energized instantaneously independently of the closing of said shunt circuit switch and to prevent current from passing from said shunt circuit to said resistance heater when said shunt circuit switch is closed whereby said light circuit is energizable instantaneously independently of said shunt circuit.

11. The invention as set forth in claim 7 wherein said ignition switch further includes an accessory terminal independently connectible to said battery terminal and connectible thereto through said ignition terminal, and wherein said means for connecting said light circuit to said battery comprises a lead connected to said battery terminal, and a relay having relay contacts interposed in said lead, the coil of said relay being connected to said accessory terminal whereby said relay coil is energizable from said accessory terminal and said light circuit is energizable instantaneously independently of said shunt circuit and directly from said battery terminal.

12. The invention as set forth in claim 11 wherein said ignition switch further includes a starter terminal connectible to said battery terminal with said ignition terminal but independently of said accessory terminal, and further including means connecting the coil of said relay to said starter terminal whereby said relay coil and thereby said load circuit may be energized alternatively from said accessory terminal or said starter terminal.

References Cited

UNITED STATES PATENTS

| | | | |
|---|---|---|---|
| 2,751,507 | 6/1956 | Crum | 307—10 |
| 2,793,301 | 5/1957 | Long | 307—10 |
| 2,806,980 | 9/1957 | Shapiro | 315—83 |
| 3,145,322 | 8/1964 | Yazigi. | |

ROBERT K. SCHAEFER, *Primary Examiner.*

D. SMITH, JR., *Assistant Examiner.*

U.S. Cl. X.R.

315—83